United States Patent
Crouch, Jr. et al.

(10) Patent No.: US 6,946,218 B2
(45) Date of Patent: Sep. 20, 2005

(54) BATTERY CELL HAVING EDGE SUPPORT AND METHOD OF MAKING THE SAME

(75) Inventors: Dell Albert Crouch, Jr., Noblesville, IN (US); Gregory K. Maclean, Indianapolis, IN (US)

(73) Assignee: Enerdel, Inc., Fort Lauderdale, FL (US)

( * ) Notice: Subject to any disclaimer, the term of this patent is extended or adjusted under 35 U.S.C. 154(b) by 361 days.

(21) Appl. No.: 10/236,240

(22) Filed: Sep. 6, 2002

(65) Prior Publication Data

US 2004/0048150 A1 Mar. 11, 2004

(51) Int. Cl.[7] .......................... H01M 2/14; H01M 2/08
(52) U.S. Cl. .................... 429/130; 429/142; 429/162; 429/185; 29/623.1
(58) Field of Search .................... 429/60, 130, 142, 429/162, 185, 246; 29/623.1

(56) References Cited

U.S. PATENT DOCUMENTS

| | | | |
|---|---|---|---|
| 3,226,262 A | * | 12/1965 | Rohrback et al. ........ 429/130 X |
| 3,990,916 A | * | 11/1976 | Sugimoto et al. ........... 429/142 |
| 5,486,433 A | * | 1/1996 | Glaser ................... 29/623.1 X |
| 6,017,653 A | * | 1/2000 | Petrakovich et al. ..... 429/246 X |
| 6,183,912 B1 | | 2/2001 | Nazri ....................... 429/231.8 |
| 6,291,097 B1 | | 9/2001 | Barker et al. ................ 429/161 |
| 6,406,815 B1 | | 6/2002 | Sandberg et al. ....... 429/231.95 |
| 6,413,668 B1 | | 7/2002 | Sandberg et al. ........... 429/174 |
| 6,419,712 B1 | | 7/2002 | Haverstick ................. 29/623.5 |
| 6,456,042 B1 | | 9/2002 | Kwok ......................... 320/134 |
| 6,617,078 B1 | | 9/2003 | Chia et al. .................. 429/316 |
| 2002/0064710 A1 | * | 5/2002 | Kawakami et al. ....... 429/60 X |

\* cited by examiner

Primary Examiner—Stephen J. Kalafut
(74) Attorney, Agent, or Firm—Akerman Senterfitt

(57) ABSTRACT

The present invention, a cell layer edge support, provides longer battery cell life while minimizing the possibility of shorts within the cell. More specifically, an edge support layer is positioned around at least a portion of the smaller electrode, either the anode or the cathode, in the cell to define a supporting perimeter comparable to the perimeter of the larger electrode. The support layer generally comprises a polymeric material which helps to absorb pressures exerted on the cell layers during packaging. The anode, cathode, support layer and a separator layer placed between the anode and the cathode may be joined to form a battery. Preferably, a plurality of cells having the support layer may be joined to form a higher energy, longer life battery.

30 Claims, 1 Drawing Sheet

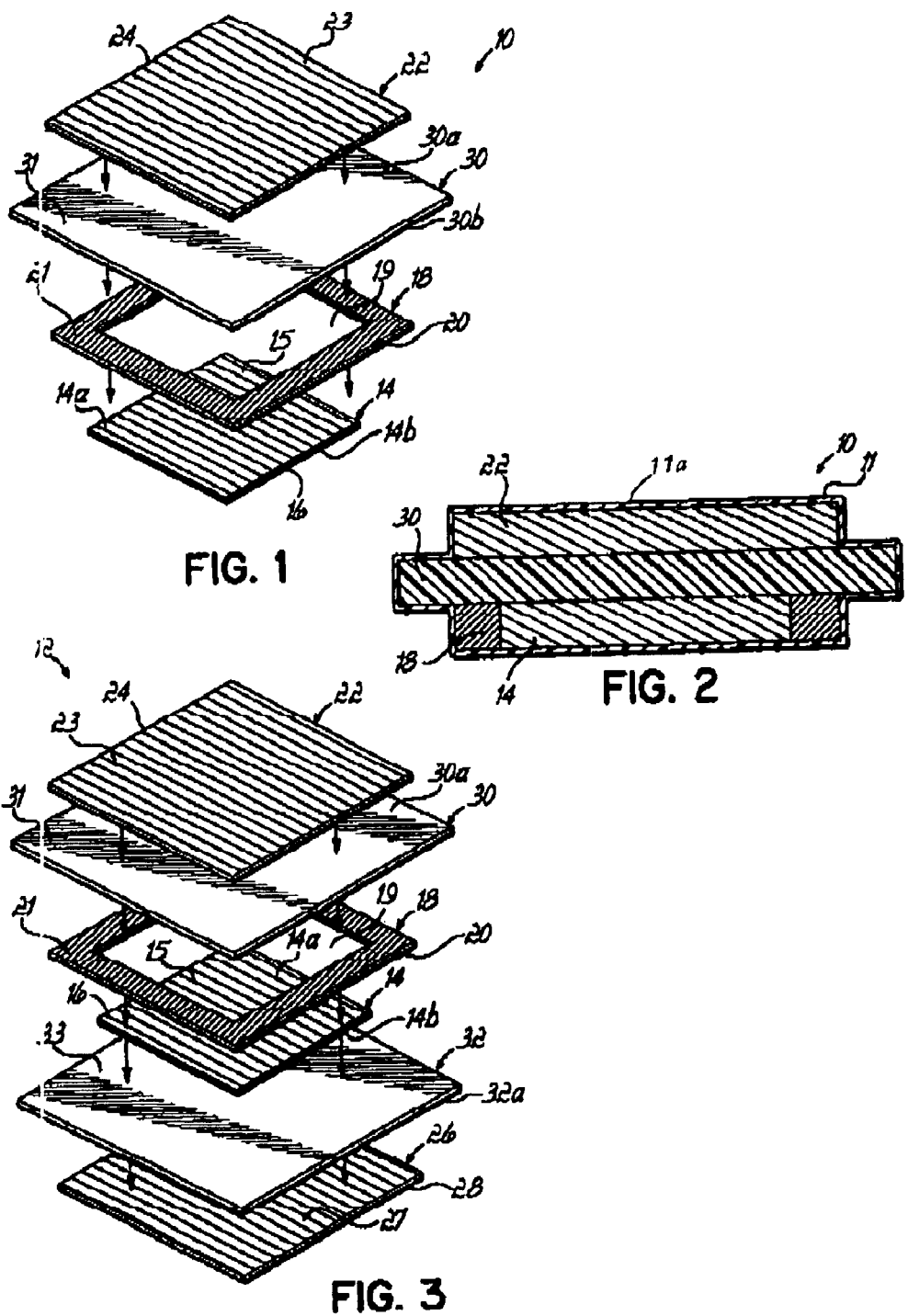

BATTERY CELL HAVING EDGE SUPPORT AND METHOD OF MAKING THE SAME

TECHNICAL FIELD

This invention relates to a method of preparation of battery cells, and in particular to battery cells having a support layer to support the edges and corners of electrodes during packaging of the cells.

BACKGROUND OF THE INVENTION

Cells and batteries are energy storage devices well known in the art. Cells typically comprise electrodes and an ion conducting electrolyte therebetween. For example, the rechargeable lithium ion cell, known as a rocking chair type lithium ion battery, typically comprises essentially two electrodes, an anode and a cathode, and a non-aqueous lithium ion conducting electrolyte therebetween. The anode (negative electrode) is a carbonaceous electrode that is capable of intercalating lithium ions. The cathode (positive electrode), a lithium retentive electrode, is also capable of intercalating lithium ions. The carbon anode comprises any of the various types of carbon (e.g., graphite, coke, carbon fiber, etc.) which are capable of reversibly storing lithium species, and which are bonded to an electrochemically conductive current collector (e.g., copper foil) by means of a suitable organic binder (e.g., polyvinylidine fluoride, PVdF).

The cathode comprises such materials as transition metals and chalcogenides that are bonded to an electrochemically conducted current collector (e.g., aluminum foil) by a suitable organic binder. Chalcogenide compounds include oxides, sulfides, selenides, and tellurides of such metals as vanadium, titanium, chromium, copper, molybdenum, niobium, iron, nickel, cobalt, and manganese. Lithiated transition metal oxides are, at present, the preferred positive electrode intercalation compounds. Examples of suitable cathode materials include $LiMnO_2$, $LiCoO_2$, $LiNiO_2$, and $LiFePO_4$, their solid solutions and/or their combination with other metal oxides and dopant elements, e.g., titanium, magnesium, aluminum, boron, etc.

The electrolyte in such lithium ion cells comprises a lithium salt dissolved in a non-aqueous solvent which may be (1) completely liquid, (2) an immobilized liquid (e.g., gelled or entrapped in a polymer matrix), or (3) a pure polymer. Known polymer matrices for entrapping the electrolyte include polyacrylates, polyurethanes, polydialkylsiloxanes, polymethacrylates, polyphosphazenes, polyethers, polyvinylidine fluorides, polyolefins such as polypropylene and polyethylene, and polycarbonates, and may be polymerized in situ in the presence of the electrolyte to trap the electrolyte therein as the polymerization occurs. Known polymers for pure polymer electrolyte systems include polyethylene oxide (PEO), polymethylene-polyethylene oxide (MPEO), or polyphosphazenes (PPE). Known lithium salts for this purpose include, for example, $LiPF_6$, $LiClO_4$, $LiSCN$, $LiAlCl_4$, $LiBF_4$, $LiN(CF_3SO_2)_2$, $LiCF_3SO_3$, $LiC(SO_2CF_3)_3$, $LiO_3SCF_2CF_3$, $LiC_6F_5SO_3$, $LiCF_3CO_2$, $LiAsF_6$, and $LiSbF_6$. Known organic solvents for the lithium salts include, for example, alkyl carbonates (e.g., propylene carbonate and ethylene carbonate), dialkyl carbonates, cyclic ethers, cyclic esters, glymes, lactones, formates, esters, sulfones, nitrates, and oxazoladinones. The electrolyte is incorporated into pores in a separator layer between the anode and the cathode. The separator layer may be either a microporous polyolefin membrane or a polymeric material containing a suitable ceramic or ceramic/polymer material. Silica is a typical main component of this latter type of separator layer.

Lithium ion battery cells, as are most cells, are often made by adhering, e.g., by laminating, thin films of the anode, cathode, and the electrolyte/separator layers together wherein the electrolyte/separator layer is sandwiched between the anode and cathode layers to form an individual cell. A plurality of such cells are generally bundled together, in what is typically known as a cell stack or winding, and packaged to form a higher energy/voltage battery. Packaging of the cell or cell stack generally involves a vacuum seal lamination process requiring complex packaging equipment. During packaging, the pressures and forces are exerted upon the individual cell layers, which may cause vulnerable edges and corners of the electrode layers in each cell to be bent, crushed or otherwise damaged. This damage often decreases the overall life and power of the cell. Specifically, damage to the electrode films results in non-uniform utilization of the active materials, which in turn, can lead to lithium plating and loss of life. In addition, the pressure exerted on the electrode layers may cause the separator to split thereby posing possible risks of shorting within the battery.

Thus, there is a need to develop a cell construct and method of assembly to produce a more robust battery cell having longer life and increased activity, and which is less prone to developing shorts.

SUMMARY OF THE INVENTION

The present invention provides a robust battery cell, and in particular, a robust lithium ion battery cell, having long cell life and high activity with minimal risk of shorting. The battery cell comprises a support layer surrounding at least a portion of the outer edge, referred to as edge perimeter, of the smaller of the anode and cathode electrode layers and adjacent to the electrolyte/separator layer. The support layer provides support and strength primarily to the larger of the anode and cathode electrode layers as well as to the electrolyte/separator layer therebetween during vacuum sealing and exposure to other associated cell-packaging pressures. The support layer thus provides added rigidity and resistance to crushing during manufacture and packaging of the battery cell.

In an exemplary embodiment, the support layer may generally be in the shape of a frame having an edge perimeter and an open central portion. The support layer frame is positioned around the smaller electrode such that the smaller electrode lies within the open central portion allowing the edge perimeter of the support layer to provide support to the larger electrode, in particular the edges of the larger electrode, when the two electrodes are assembled and packaged together. The support layer may extend outwardly in the horizontal plane of the smaller electrode and beyond the edge perimeter of the larger electrode, but optimally the extension should be substantially equal to the edge perimeter of the larger electrode. The support layer of the present invention advantageously comprises polymers, including homopolymers, copolymers, or mixtures thereof.

The present invention also provides a method of preparing the battery cell including the support layer described above. The method comprises joining at least one anode, at least one cathode, at least one support layer positioned in surrounding relation to at least a portion of the smaller of the anode or cathode, and at least one electrode/separator layer sandwiched between the anode and cathode to form at least a single cell. Similarly, a plurality of single cells may be joined to form a battery. Multiple cells may be arranged as a cell stack or winding with support layers placed around each of the smaller of the anode or cathode in each cell. The anodes, cathodes, electrolyte/separator layers, and support layers in the cell stack may be sealed together to form the battery.

In constructing or assembling the cell, the support layer may be first placed adjacent to the surface of the electrolyte/separator layer followed by placement of the smaller electrode inside the open central portion of the support layer. Alternatively, the support layer may be placed around the smaller electrode prior to placement adjacent the separator layer. The smaller electrode, the support layer, the larger electrode and the electrolyte/separator layer are then joined to form a battery cell. Joining is typically accomplished by conventional packaging equipment, such as vacuum sealing or laminating equipment, to seal or enclose the cell or cell stack to form a battery. By virtue of the support layer, the edges of the larger electrode resist bending and crushing during the joining process.

BRIEF DESCRIPTION OF THE DRAWINGS

The present invention will now be described, by way of example, with reference to the accompanying drawings, in which:

FIG. 1 is an exploded view of a battery cell.

FIG. 2 is a cross-sectional view of a packaged battery cell.

FIG. 3 is an exploded view of a battery cell stack having two cells.

DETAILED DESCRIPTION

The invention is hereinafter described with general reference to a lithium ion battery cell, however, it may also be applied to other non-lithium ion conducting battery cells. As shown in FIG. 1, an embodiment of a battery cell 10 comprises a first electrode 14 and a second electrode 22 separated by an electrolyte/separator layer 30, referred to simply as separator layer 30. Either of the first electrode 14 or the second electrode 22 may be an anode, with the other being a cathode in the cell 10. The first electrode 14 has an outer edge or an edge perimeter 16 defining a surface area 15. Similarly, the second electrode 22 has an edge perimeter 24 defining a surface area 23. Surface area 23 is larger than surface area 15. Thus, first electrode 14 is a smaller electrode than second electrode 22. A support layer 18 having an edge perimeter 20 and an open central portion 9 is positioned around at least a portion of the first electrode 14. Advantageously, the support layer 18 is positioned around the entire first electrode 14. The open central portion 19 defines area which is generally equal to or larger than the surface area 15 of the first electrode 14. Preferably, the area defined by central portion 19 can be substantially equal to surface area 15 to maximize support for the electrodes in the cell. In constructing the cell, edge perimeter 20 in positioned to surround the first electrode 14 generally in substantially the same plane in which first electrode 14 lies, whereby first electrode 14 occupies central portion 19 of support layer 18. As shown in FIGS. 1 and 2, first electrode 14 and second electrode 22 are assembled together with separator layer 30 therebetween to form cell 10, which is di packaged with laminate material 11a using laminating equipment to form seal 11. Vacuum sealing is preferably used to form seal 11. Support layer 18 provides beneficial support to the larger second electrode 22 during packaging of the cell 10 by adding strength and rigidity to the edges and corners of second electrode 22, for example, to reduce or prevent the edges and corners from being bent or crushed under packaging pressures.

The edge perimeter 20 of support layer 18 generally determines the level of support provided to second electrode 22. Edge perimeter 20 defines an area 21 which includes the area defined by open central portion 19. Area 21 may be larger than the surface area 23 of second electrode 22. In other words, the edge perimeter 20 of the support layer 18 may extend outwardly beyond the edges and corners of edge perimeter 24 of second electrode layer 22. Alternatively, support layer 18 may have an area 21 substantially equal to the surface area 23 of larger second electrode 22 thereby having an edge perimeter 20 substantially equal to the edge perimeter 24 of the second electrode 22 to provide adequate support. Such a support layer 18 would absorb pressures, for example, including air pressure and vacuum pressure, exerted on cell 10 during packaging thereby relieving second electrode 22 from exposure to the total pressure of packaging. Such a relief in pressure coupled with the support provided to second electrode 22 to withstand packaging pressures significantly reduces or may even prevent bending or crushing the otherwise vulnerable corners and edges of second electrode 22.

While support layer 18 is illustrated and described as a frame-like structure surrounding the entire first electrode 14, the present invention is not so limited. Persons of ordinary skill in the art will readily understand that the benefits of the support layer 18 may be available in instances where the support layer 18 only surrounds a portion of the first electrode 14. For example, the support layer 18 may be provided to support only two opposing edges of first electrode 14 leaving the other edges free. Advantageously, the support layer 18 will be provided for and surround at least those portions of the first electrode 14 which are vulnerable to pressures during packaging of the battery cell 10.

The support layer 18 may be any material compatible for use in a battery cell 10. Ideally, the support layer 18 may comprise a polymeric material. This polymeric material may be the same material used in the binder of either the first electrode 14 or the second electrode 22, or it may be different. Examples of polymeric materials suitable for the present invention include but are not limited to, homopolymers, copolymers, or mixtures of polymers such as vinylidine fluoride, vinylidine chloride fluoride, vinylidine chloride, vinylchloride, acrylonitrile fluoroethylene, fluoropropylene, chlorofluoroethylene, chlorofluoropropylene, chloroethylene, chloropropylene, ethylene, propylene, vinylalcohol, glycol, acetate, ester, acrylate, carbonate, ethylene oxide, propylene oxide, acrylic acid modified olefins, maleic acid modified olefins, cellulose, nylon, urethane, terephthalate, and styrene.

As shown in FIGS. 1 and 2, a separator layer 30, which includes an electrolyte, is placed between the first electrode 14 and the second electrode 22 to provide a medium for cell activity and ultimate conduction of electricity. Separator layer 30 may be any size necessary for optimal cell activity. For example, the separator layer 30 shown in FIGS. 1 and 2 generally has a surface area 31 larger than surface areas 15 and 23 of first and second electrodes 14 and 22, respectively. Alternatively, surface area 31 may be substantially equal to area 21 defined by edge perimeter 20 of support layer 18 or substantially equal to surface area 23 of second electrode 22.

The first electrode 14, second electrode 22, and separator layer 30, typically comprise polymeric materials. The first electrode 14 and the second electrode 22 generally include an organic binder containing the polymeric material. By way of example only, and not limitation, suitable polymeric materials include homopolymers, copolymers, or mixtures of polymers such as polyvinylidine fluoride, polyvinylidine chloride fluoride, polyvinylidine chloride, polyvinylchloride, polyvinylchloride acetates, polyacrylonitriles, polyfluoroethylenes, and polyolefins such as polypropylene and polyethylene, acrylic or maleic acid modified polyethylene or polypropylene, polyvinylalcohols, polyglycols, and the like. These materials may be obtained from commercial sources as is known to one skilled in the art.

Lithium ion and other non-lithium ion batteries may comprise a plurality of the individual cells 10 illustrated in FIG. 1, each formed from individual small first and large second electrodes separated by a separator layer. The cells are generally arranged in a cell stack and packaged to from a battery. In such a battery, at least a portion of one or more of the first electrodes 14, having a surface area 15 smaller than that of the counter second electrode 22, may be surrounded by a support layer 18. One embodiment of the present invention, shown in FIG. 3, is a cell stack 12 containing two cells sharing a single small first electrode 14. The first electrode 14 has opposing surfaces 14a, 14b and a first edge perimeter 16 defining a first surface area 15. A support layer 18 defining an open central portion 19 and an edge perimeter 20 is placed in surrounding relation to the first electrode 14. Two separator layers 30 and 32 are placed adjacent to and in contact with opposing surfaces 14a, 14b, respectively, of the first electrode 14. The individual sizes and polymeric materials of the two separator layers 30 and 32 may be the same or different as determined by the user and generally depends upon the voltage requirements and cost of the battery. As shown in FIG. 3, the surface area 33 of separator layer 32 is substantially equal to the surface area 31 of separator layer 30. Adjacent to and contacting the surfaces 30a and 32a, respectively, of separator layers 30 and 32 opposing the first electrode 14 are second electrode 22 and third electrode 26, respectively. Adjacent to and contacting the surface 30b of separator layer 30 is support layer 18. Second electrode 22 and third electrode 26 have surface areas 23 and 27, respectively, defined by edge perimeters 24 and 28, which may be substantially equal to the area 21 defined by the edge perimeter 20 of the support layer 18. The surface areas 23 and 27 of electrodes 22 and 26, respectively, may be equal or different in size. Advantageously, the surface areas 23 and 27 are substantially equal to the area 21 of support layer 18. In this fashion, the support layer 18 maximizes support to both larger second and third electrodes 22 and 26 by maintaining a uniform outer edge surface of cell stack 12 without allowing the edges and corners of electrodes 22 and 26 from becoming vulnerable to pressures exerted during packaging and internal pressures maintained during the lifetime of the vacuum sealed dual-cell battery.

The present invention also provides a method of constructing or assembling a battery cell, such as a lithium ion battery cell, having a support layer. Referring again to FIG. 1, the method comprises providing at least one anode and at least one cathode wherein either of the anode or the cathode is the first electrode 14 having a surface area 15 that is smaller relative to the larger surface area 23 of the other of the anode or the cathode, i.e., second electrode 22. A support layer 18 is provided in surrounding contact with at least a portion of the first electrode 14 whereby the support layer 18 is adapted to provide reinforcing support to the larger second electrode 22. Optimally, every first electrode 14 in a cell stack is surrounded by a support layer 18 during subsequent packaging in a multi-cell battery. Between each first electrode 14 and second electrode 22 in sequence, a separator layer 30 is placed, and first electrode 14, support layer 18, second electrode 22, and separator layer 30 are joined to form a battery cell 10.

Joining may involve vacuum sealing or other lamination methods to package the cell. As shown in FIG. 2, seal 11 of cell 10 encloses the cell 10 and its components, first electrode 14, support layer 18, second electrode 22, and separator layer 30 under vacuum. Vacuum and air pressures exerted on the cell 10 by packaging equipment conventionally used to package batteries vary depending on equipment. Conventional techniques known in the art to join components of a battery cell are suitable in the method of the present invention.

Other aspects of the present method include placing support layer 18 adjacent to the separator layer 30 prior to adding the first electrode 14 and joining the layers together to provide a joined battery cell 10. Upon joining cell 10 would have the support layer 18 in a surrounding relation with at least a portion of the edge perimeter 16 of the smaller surface area 15 of first electrode 14, i.e., either the anode or the cathode. Alternatively, battery cell 10 may be assembled such that the support layer 18 is independently provided in a surrounding relation with the edge perimeter 16 of smaller first electrode 14 prior to joining the layers together to form the cell 10.

Accordingly, the support layer of the present invention provides sufficient support for larger electrode layers during packaging to eliminate the need for more complex and expensive packaging equipment, materials and processes, such as pre-formed or rigid packaging processes, for the manufacture and packaging of battery cells. Consequently, a capital cost savings, including equipment, materials and fabrication process savings together with battery cells having longer lifetimes and fewer shorts, may be realized during production.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of Applicants' general inventive concept.

What is claimed is:

1. A laminated battery cell comprising:
   a first electrode an a second electrode, wherein the first electrode has a first edge perimeter defining a smaller area than an opposing area of the second electrode;
   a separator layer between the first second electrodes;
   a support layer having an interface with said separator layer, said support layer surrounding at least a portion of the first edge perimeter of the first electrode, and
   a laminate material forming a seal around said first and second electrode, said separator layer and said support layer, wherein said support layer provides reinforcing support to the second electrode to substantially prevent said laminate material from deforming an edge portion of said second electrode during vacuum sealing.

2. The battery cell of claim 1, wherein the battery cell is a lithium ion battery cell.

3. The lithium ion battery cell of claim 2 wherein the support layer surrounds the entire first edge perimeter of the first electrode.

4. The lithium ion battery cell of claim 2 wherein the support layer is shaped as a frame having a second edge perimeter and an open central portion, the second edge perimeter being substantially equal to a third edge perimeter of the second electrode and the central portion defining an area substantially equal to the area defined by the first edge perimeter.

5. The lithium ion battery cell of claim 2 wherein the support layer comprises a polymeric material.

6. The lithium ion battery cell of claim 5 wherein the first electrode includes a binder comprising a polymeric material that is the same polymeric material comprising the support layer.

7. The lithium ion battery cell of claim 5 wherein the second electrode includes a binder comprising a polymeric material that is the same polymeric material comprising the support layer.

8. The lithium ion battery cell of claim 5 wherein the polymeric material is a homopolymer, a copolymer, or a mixture thereof.

9. The lithium ion battery of claim 5 wherein the polymeric material comprises at least one polymer selected from the group consisting of: vinylidene fluoride, vinylidene chloride fluoride, vinylidene chloride, vinyl chloride, acrylonitrile, fluoroethylene, fluoropropylene, chlorofluoroethylene, chlorofluoropropylene, chloroethylene, chloropropylene, ethylene, propylene, vinyl alcohol, glycol, acetate, ester, acrylate, carbonate, ethylene oxide, propylene oxide, acrylic acid modified olefin, maleic, acid modified olefin, cellulose, nylon, urethane, terephthalate, and styrene.

10. A battery cell stack comprising:
 a first electrode having first and second opposing surfaces and having a first edge perimeter defining a first area;
 a support layer surrounding at least a portion of the first edge perimeter of the first electrode;
 first and second separator layers adjacent and contacting the respective first and second opposing surfaces the first electrode;
 a second electrode adjacent and containing the first separator layer on a surface opposite the first electrode, the second electrode having a second edge perimeter defining a second area;
 a third electrode adjacent and contacting the second separator layer on a surface opposite the first electrode, the third electrode having a third edge perimeter defining a third area;
 wherein the second and third areas are larger the first area, whereby the support layer provides reinforcing support to the second and third electrode layers.

11. The battery cell of claim 10 wherein the battery cell is a lithium ion battery cell.

12. The lithium ion battery cell of claim 11 wherein the support layer surrounds the entire first edge perimeter of the first electrode.

13. The lithium ion battery cell of claim 11 wherein the support layer is shaped as a frame having a fourth edge perimeter and an open central portion, the fourth edge perimeter being substantially equal to the second and third edge perimeters, and the open central portion defining an area substantially equal to the first area.

14. The lithium ion battery cell of claim 11 wherein the support layer comprises a polymeric material.

15. The lithium ion battery cell of claim 14 wherein the first electrode includes a binder comprising a polymeric material that is the same polymeric material comprising the support layer.

16. The lithium ion battery cell of claim 14 wherein the second and third electrodes each include a binder comprising a polymeric material that is the same polymeric material comprising the support layer.

17. The lithium ion battery cell of claim 14 further comprising a laminate film forming a vacuum seal around said battery cell stack, wherein said support layer provides reinforcing support to the second electrode to substantially prevent said laminate film from deforming an edge portion of at least one of said second electrode and said third electrode during vacuum sealing.

18. The lithium ion battery of claim 14 wherein said support layer has an interface with said separator layer.

19. A method of constructing a battery cell comprising:
 providing at least one anode;
 providing at least one cathode, wherein one of anode and cathode has a small surface area relative to a large surface area of the other of the anode and cathode;
 providing at least one a support layer in surrounding contact with at least a portion of the one of the anode and cathode having the small surface area, wherein the support layer is adapted to reinforce the large surface area of the other of the anode arid cathode;
 providing a separator layer between the anode and cathode; and
 vacuum sealing the anode, the separator layer, the support layer and the cathode with laminate material to form a battery cell, wherein said support layer substantially prevents said laminate material from deforming an edge portion of the large surface area of the other of the anode and cathode.

20. The method of claim 19 wherein the battery cell constructed is a lithium ion battery cell.

21. The method of claim 20 wherein the support layer is provided to completely surroundingly contact the one of anode and cathode.

22. The method of claim 20 wherein said support layer has an interface with said separator layer.

23. The method claim 20 wherein providing the support layer provides a combined surface area for the support layer and the small surface area of the one of the anode and cathode that is substantially equal to the large surface area of the other of the anode and cathode.

24. The method of claim 20 wherein the support layer comprises a polymeric material.

25. The method of claim 24 wherein the polymeric material is a homopolymer, a copolymer, or a mixture thereof.

26. The method of claim 24 wherein the polymeric material comprises one or more polymers selected from the group consisting of: vinylidene fluoride, vinylidene chloride fluoride, vinylidene chloride, vinyl chloride, acrylonitrile, fluoroethylene, fluoropropylene, chlorofluoroethylene, chlorofluoropropylene, chloroethylene, chloropropylene, ethylene, propylene, vinyl alcohol, glycol, acetate, ester, acrylate, carbonate, ethylene oxide, propylene oxide, acrylic acid modified olefin, maleic acid modified olefin, cellulose, nylon, urethane, terephthalate, and styrene.

27. The method of claim 20 wherein the support layer is placed adjacent to a surface of the separator layer prior to joining, whereby after joining, the support layer is surrounding contact with at least a portion of one of the anode and cathode having the small surface area.

28. The method of claim 27 wherein the support layer is in surrounding contact with the small surface area of the anode and cathode.

29. The method of claim 20 wherein the support layer is provided in surrounding contact with at least a portion of one of the anode and cathode having the small surface area prior to joining.

30. The method of claim 29 wherein the support layer is provided in surrounding contact with the entire small surface area of one of the anode and cathode.

* * * * *